United States Patent
Abrahamsson et al.

(10) Patent No.: US 11,181,402 B2
(45) Date of Patent: Nov. 23, 2021

(54) SYSTEM AND METHOD FOR THE ASSISTED CALIBRATION OF SENSORS DISTRIBUTED ACROSS DIFFERENT DEVICES

(71) Applicant: SONY MOBILE COMMUNICATIONS AB, Lund (SE)

(72) Inventors: Magnus Abrahamsson, Löddeköpinge (SE); Gunnar Klinghult, Lund (SE); Andreas Kristensson, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 1109 days.

(21) Appl. No.: 14/357,540

(22) PCT Filed: Oct. 26, 2012

(86) PCT No.: PCT/IB2012/055932
§ 371 (c)(1),
(2) Date: May 9, 2014

(87) PCT Pub. No.: WO2013/068873
PCT Pub. Date: May 16, 2013

(65) Prior Publication Data
US 2014/0343885 A1 Nov. 20, 2014

Related U.S. Application Data

(60) Provisional application No. 61/558,517, filed on Nov. 11, 2011.

(51) Int. Cl.
*G01D 18/00* (2006.01)
*G01P 21/00* (2006.01)
(Continued)

(52) U.S. Cl.
CPC .......... *G01D 18/00* (2013.01); *G01C 22/006* (2013.01); *G01C 25/00* (2013.01); *G01P 21/00* (2013.01)

(58) Field of Classification Search
CPC ..... G01C 25/00; G01C 25/005; F24F 11/001; H04W 4/22; A63B 24/0062;
(Continued)

(56) References Cited

U.S. PATENT DOCUMENTS 5,805,767 A * 9/1998 Jouas ................. G05D 23/1902
   219/506
9,146,134 B2 * 9/2015 Lokshin ............... G01C 25/005
(Continued)

FOREIGN PATENT DOCUMENTS

| EP | 1154231 A1 | 11/2001 |
| EP | 1310770 A1 | 5/2003 |
| EP | 1310770 B1 | 9/2009 |

OTHER PUBLICATIONS

Vicki Barwick "Preparation of Calibration Curves", Sep. 2003, pp. 1-27.*

(Continued)

*Primary Examiner* — Regis J Betsch
*Assistant Examiner* — Kaleria Knox
(74) *Attorney, Agent, or Firm* — Tucker Ellis LLP

(57) ABSTRACT

Sensors in one or more remote devices provide sensor output to a device having a controller. The controller analyzes the sensor data to determine the accuracy of the sensors outputting the sensor data. Based on the analysis, the controller calculates a calibration value to utilize in calibrating one or more of the sensors in the remote devices, or in one or more other devices.

19 Claims, 9 Drawing Sheets

(51) Int. Cl.
  *G01C 25/00* (2006.01)
  *G01C 22/00* (2006.01)

(58) Field of Classification Search
  CPC ....... A63B 24/0006; H04N 7/18; F27F 11/30;
    G06F 9/542; B01L 7/54; G05D 23/1902
  USPC ............ 600/595; 463/8; 755/404.2; 702/104
  See application file for complete search history.

(56) References Cited

U.S. PATENT DOCUMENTS

| | | | |
|---|---|---|---|
| 10,165,228 B2 * | 12/2018 | Stephanson | ............ H04N 7/183 |
| 2001/0022828 A1 | 9/2001 | Pyles | |
| 2002/0157951 A1 * | 10/2002 | Foret | ........................ B01L 7/54 |
| | | | 204/451 |
| 2003/0115930 A1 | 6/2003 | Kappi et al. | |
| 2005/0134581 A1 | 6/2005 | Hawkins et al. | |
| 2007/0100666 A1 * | 5/2007 | Stivoric | ................... F24F 11/30 |
| | | | 705/3 |
| 2007/0214231 A1 | 9/2007 | Skinner et al. | |
| 2007/0239399 A1 * | 10/2007 | Sheynblat | ............... G06F 9/542 |
| | | | 702/187 |
| 2007/0270721 A1 * | 11/2007 | Ananny | ............. A63B 24/0062 |
| | | | 600/595 |
| 2009/0322548 A1 | 12/2009 | Gottlieb | |
| 2010/0144414 A1 * | 6/2010 | Edis | .................... A63B 24/0006 |
| | | | 463/8 |
| 2010/0164297 A1 | 7/2010 | Kurs et al. | |
| 2010/0201203 A1 | 8/2010 | Schatz et al. | |
| 2010/0222648 A1 | 9/2010 | Tan | |
| 2010/0289341 A1 | 11/2010 | Ozaki et al. | |
| 2011/0050164 A1 | 3/2011 | Partovi et al. | |
| 2011/0098087 A1 | 4/2011 | Tseng | |
| 2011/0187318 A1 | 8/2011 | Hui et al. | |
| 2012/0078563 A1 * | 3/2012 | Grabinger | .............. F24F 11/001 |
| | | | 702/104 |
| 2012/0225634 A1 * | 9/2012 | Gee | ......... H04W 4/22 |
| | | | 455/404.2 |
| 2013/0128022 A1 * | 5/2013 | Bose | ........ H04N 7/18 |
| | | | 348/77 |
| 2013/0193773 A1 | 8/2013 | Van Wageningen | |

OTHER PUBLICATIONS

International Search Report dated Feb. 26, 2013 in re PCT Application No. PCT/IB2012/055932 filed Oct. 26, 2012.

* cited by examiner

SYSTEM AND METHOD FOR THE ASSISTED CALIBRATION OF SENSORS DISTRIBUTED ACROSS DIFFERENT DEVICES

RELATED APPLICATIONS

This application claims priority to U.S. Provisional Application Ser. No. 61/558,517, filed Nov. 11, 2011 and entitled "System and Method for the Assisted Calibration of Sensors Distributed Across Different Devices." The entire contents of the '517 application are incorporated herein by reference.

FIELD OF THE INVENTION

The present invention relates generally to systems and methods for calibrating sensors and, more particularly, to systems and methods for calibrating sensors that are distributed across different devices.

BACKGROUND

There has been an increased interest in sensors and their practical applications. Recognizing the interest, manufacturers have started to integrate sensors into their product devices, as well as the software applications that use their output. Some exemplary devices and products that incorporate sensors include, but are not limited to, cellular telephones, headsets, clothing, bracelets, watches, and glasses.

Generally, manufacturers can integrate any desired type of sensor into their product or device to obtain a desired type of data. For example, pressure sensors may be used to measure air pressure and provide data indicating an altitude or height above sea level. Magnetometers are used to measure the strength and/or direction of a magnetic field. Gyroscopes are used to measure an external torque that may be exerted on an object and indicate an orientation of the object responsive to that torque. Accelerometers are used to measure the acceleration of an object and provide data indicating that acceleration. In some cases, sensor output may be the combination of data output by multiple sensors. By way of example, a device may provide an electronic compass function to indicate an absolute heading (e.g., North, South, etc.) by combining the data outputs of a magnetometer and an accelerometer. Of course, these sensors and their functions are only illustrative. Manufacturers may integrate other types of sensors into their products and devices and use them to provide other data.

Regardless of their function, however, sensors must be very small to facilitate integration. Thus, in many cases, manufacturers utilize sensors that are Micro-Electro-Mechanical Systems (MEMS) devices. However, the size of a sensor is not the only factor that manufacturers must consider. For example, it is important for sensors to be accurately calibrated so that they provide accurate readings. Although manufacturers initially calibrate their sensors, a variety of environmental and other factors will tend to negatively affect the accuracy of a sensor during use. By way of example, metallic material (e.g., iron) and/or other magnetic disturbances originating from an electronic device or nearby structure may negatively affect the ability of an electronic compass to provide an accurate heading. Therefore, a user may be required to move away from the material causing the interference and calibrate the compass by moving the device containing the compass in a "figure 8" motion.

In another example, periodic calibration may be required for the sensors in an Inertial Navigation System (INS). As is known in the art, an INS application utilizes the outputs of motion and rotational sensors (e.g., accelerometers and gyroscopes) to calculate parameters such as position, orientation, and the velocity of a moving object without using other objects as external references. However, unavoidable noise and drift may cause an error in the sensor output signals that tend to increase over time. Therefore, the user may need to move to a known location from time-to-time so that the algorithms used to reset or recalibrate the sensors can do so relative to that known location.

Other sensors also need periodic calibration or compensation to correct errors introduced by the algorithms they use to determine their specific data. For example, gyroscopes generally provide a measure of rotation of an object (e.g., a user's head) in degrees per second. Therefore, to obtain the actual rotation in degrees, the device receiving the gyroscope output must integrate that output with respect to time. Such calculations, as is known in the art, can introduce undesirable, yet unavoidable, errors. Thus, the function or algorithm used for the calculations may need to be first reset or recalibrated in a known direction, and then used to determine the actual rotation from that known point.

Although useful, conventional methods of calibrating sensors or compensating their output data are not always practical. For example, it may not be practical for a user to perform the "figure 8" movement needed to calibrate an electronic compass if the compass is integrated into a headset or article of clothing worn by the user. Similarly, a user may not always be able to move to an area free from external interference. Such problems further compounded when the output data of multiple sensors distributed across different devices is combined or used in a user application.

SUMMARY

The present invention provides a method for collecting data output by one or more sensors, and using that data to calibrate one or more of those sensors, the functions that interpret and use the sensor data in their calculations, and/or compensate the data output by those sensors. The method is especially beneficial for calibrating or compensating sensors distributed across a plurality of loosely coupled devices.

In one or more embodiments of the present invention, the method comprises receiving sensor data output by one or more sensors in one or more remote devices, determining a sensor calibration value based on the received sensor data, and calibrating a selected one of the sensors using the sensor calibration value.

In one embodiment, the method further comprises determining an accuracy of the selected sensor by analyzing sensor data received from the selected sensor, and calculating the sensor calibration value based on the determined accuracy of the selected sensor.

In one embodiment, analyzing the sensor data comprises comparing the sensor data received from the selected sensor to predetermined sensor data.

In one embodiment, calculating the predetermined sensor data based on the sensor data output by the one or more sensors in the one or more remote devices.

In one embodiment, analyzing the sensor data comprises determining movement for a device that includes the selected sensor, and comparing the sensor data received from the selected sensor to the determined movement. The movement may be, for example, a direction of movement or a detected rotation.

In one embodiment, analyzing the sensor data comprises, retrieving, from a memory, a user activity profile for a user of the device associated with the selected sensor based on the sensor data output by the selected sensor, and comparing the sensor data output by the selected sensor to information associated with the user activity profile to determine the accuracy of the selected sensor.

In one embodiment, receiving the sensor data output by the one or more sensors comprises receiving the sensor data at a network server. In such embodiments, the method further comprises calculating the sensor calibration value based on the received sensor data, and sending the sensor calibration value to one or more of the sensors in the one or more remote devices.

In one embodiment, the sensor calibration value comprises an initialization command generated for the selected sensor, and wherein calibrating the selected sensor comprises sending the initialization command to the selected sensor to initialize the selected sensor.

In one embodiment, calibrating the selected sensor comprises updating a sensor calibration parameter associated with the selected sensor based on the determined sensor calibration value.

In one embodiment, the method further comprises compensating the sensor data output by the selected sensor using the sensor calibration value.

In one embodiment, calibrating the selected sensor comprises calibrating, based on the determined sensor calibration value, one or more functions that interpret data output by the selected sensor.

In addition to the method, the present invention also provides a communications device for calibrating a sensor. In one embodiment, the communications device comprises a communications interface configured to receive sensor data output by one or more sensors in one or more remote devices, and a controller configured to calibrate a selected one of the sensors based on the received sensor data.

In one embodiment, the controller is further configured to determine an accuracy of the selected sensor by analyzing the sensor data output by the selected sensor, and calculate a sensor calibration value based on the determined accuracy of the selected sensor.

In one embodiment, the controller is further configured to calculate predetermined sensor data based on the received sensor data, and compare the sensor data output by the selected sensor to the predetermined sensor data to determine the accuracy of the selected sensor.

In one embodiment, the controller is further configured to determine movement of the remote device having the selected sensor, and compare the sensor data output by the selected sensor to the determined movement. By way of example, the determined movement may be rotational movement, or a direction of movement.

In one embodiment, the communications device further comprises a memory configured to store user activity profiles. In such embodiments, the controller is further configured to retrieve a user activity profile from the memory based on the sensor data output by the selected sensor, and compare the sensor data output by the selected sensor to information in the user activity profile to determine the accuracy of the selected sensor.

In one or more embodiments, the communications device comprises a network server. In these embodiments, the controller is at the server and is further configured to determine the sensor calibration value based on the sensor data received from the one or more sensors, and send the sensor calibration value to the remote device having the selected sensor via the communications interface.

In one embodiment, the controller is further configured to calibrate the selected sensor by sending an initialization command to initialize the selected sensor.

In one embodiment, the controller is further configured to calibrate the selected sensor by updating a sensor calibration parameter associated with the second sensor.

In one embodiment, the controller is further configured to compensate the sensor data output by the selected sensor based on the received sensor data.

In one embodiment, the selected sensor comprises a sensor integrated in the communications device. In such embodiments, the controller is further configured to calibrate the integrated sensor based on the received sensor data.

In one embodiment, the controller is further configured to calibrate the selected sensor by calibrating, based on the determined sensor calibration value, one or more functions that interpret data output by the selected sensor.

Of course, those skilled in the art will appreciate that the present invention is not limited to the above contexts or examples, and will recognize additional features and advantages upon reading the following detailed description and upon viewing the accompanying drawings

DETAILED DESCRIPTION

The present invention provides a system and method for collecting sensor data from a plurality of sensors associated with different electronic devices, and then using that data to calibrate one or more of those sensors and/or compensate the data output by those sensors. The present invention is especially beneficial for situations where the sensors are distributed across a plurality of independent, loosely-coupled electronic devices, and helps to maintain the sensors in those devices in a calibrated state. So calibrated, the sensors are able to output more accurate sensor data, which may then be used in any of a variety of user applications, such as those used to infer or determine the actions of the user.

Figure 1:
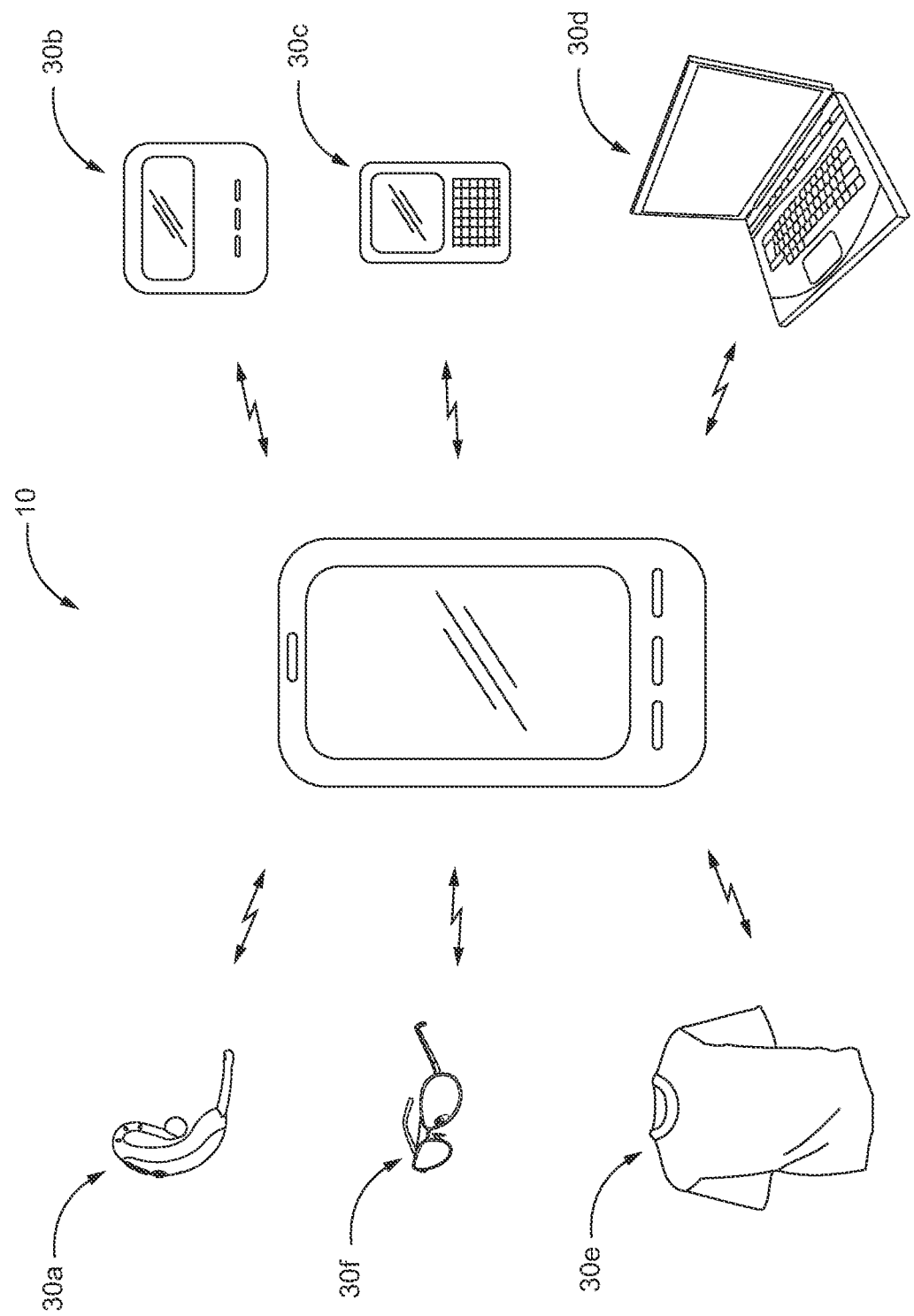
FIG. 1 is a perspective view illustrating some exemplary sensor-equipped electronic devices configured to operate according to one embodiment of the present invention.

Turning now to the drawings, FIG. 1 is a perspective view illustrating a plurality of exemplary electronic devices and items suitable for use in one or more embodiments of the present invention. As seen in FIG. 1, suitable devices comprise a cellular telephone 10 and one or more peripheral devices or items. The peripheral devices and items may or may not comprise an accessory device for cellular telephone 10; however, in accordance with the present invention, such peripheral devices or items include, but are not limited to, a wireless headset 30a, a bio-sensor device 30b (e.g., a pedometer), other wireless communications devices or Personal Data Assistants (PDAs) 30c, a computing device such as a laptop or notebook computer 30d, articles of "smart" clothing 30e, and a pair of glasses 30f (collectively, 30). For example, the glasses 30f may comprise augmented reality glasses that allow a user to interact with another device, such as the cellular telephone 10 and/or one or more network servers, without requiring the user to interact directly with the other device. Other peripheral devices and items not explicitly seen in the figures are also possible.

Each of the devices and items 10, 30 seen in FIG. 1 include one or more integrated sensors. As is known in the art, the sensors measure the physical properties or quantities of different objects or phenomenon, and convert the measurements into electronic signals referred to herein as "sensor data." In many cases, the sensor data is sent to a display of a device to provide a visual indication of the measured property or quantity. However, the sensor data may also be used to provide other indications to a user, such as to generate an alarm or a tactile vibration. Regardless of the type of indication, however, the present invention configures devices and items to collect and store the sensor data from a plurality of sensors in different devices, and utilize the sensor data to maintain one or more sensors in a calibrated state. The present invention may also configure the devices and items to utilize the sensor data to compensate the output data of sensors that are not optimally calibrated.

Unlike some conventional systems that are used by manufacturers to initially calibrate sensors; the present invention does not require that the sensors in the devices and items 10, 30 comprise the same types of sensors, or that the sensors detect the same physical properties or quantities. Rather, one or more of the sensors may be different from each other and measure different physical properties and quantities. Further, one or more of the sensors may have the same or different sensitivities.

The sensors in devices and items 10, 30 may be any sensors known in the art designed to sense or detect any desired property or quantity. Some exemplary types of sensors include, but are not limited to, accelerometers, magnetometers, ambient pressure sensors, gyroscopes, bio-sensors, microphones, thermometers, and the like. Because of their size and power requirements, one type of sensor that is feasible for use with the present invention is a Micro-Electro-Mechanical System (MEMS) device. MEMS devices and their functions are well-known in the art. Therefore, they are not discussed in great detail here. It is sufficient to say that the MEMS devices integrated into the devices and items seen in FIG. 1 are capable of sensing their respective properties and/or quantities, and providing corresponding sensor data to one or more devices for use in calibrating other sensors and/or compensating their output.

Figure 2:
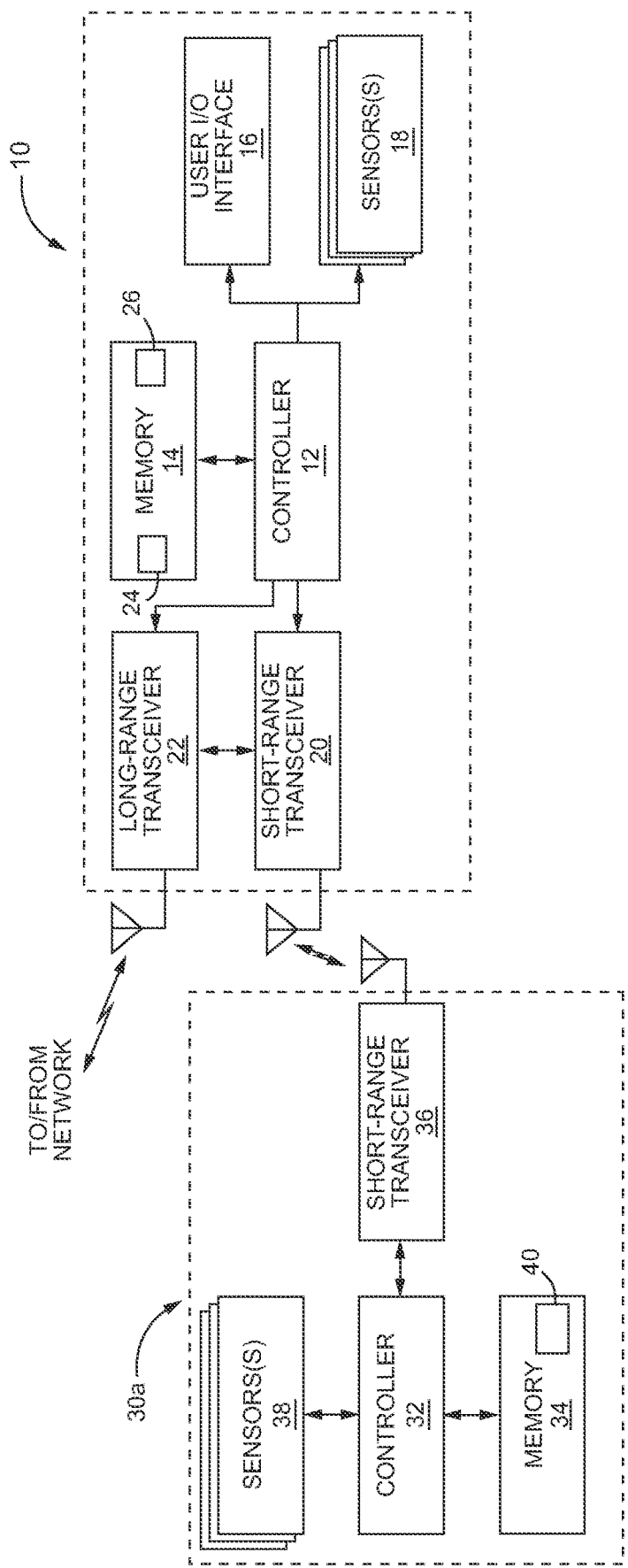
FIG. 2 is a block diagram illustrating some of the components of some exemplary sensor-equipped electronic devices configured to function according to one embodiment of the present invention.

FIG. 2 is a block diagram that illustrates some component parts of a cellular device 10 and a corresponding peripheral device 30a. For clarity and ease of discussion, the devices 10, 30a described in the following figures are referred to as cellular device 10 and headset 30a. However, as those of ordinary skill in the art will appreciate, and as previously stated, these devices 10, 30a may be any of the devices and items seen in FIG. 1 or otherwise known in the art.

As seen in FIG. 2, cellular device 10 comprises a controller 12, a memory 14, a user interface 16, one or more sensors 18, and a communication interface comprising short-range and long-range transceivers 20, 22, respectively. The controller 12 comprises one or more programmable microprocessors configured to control the cellular device 10 according to logic and instructions stored in memory 14. Such control includes the control of conventional functions, such as user I/O and communications functions, but also includes the control of the one or more sensors 18. Specifically, based on data provided by one or more remote sensors that are not necessarily integrated into cellular device 10, the controller 12 calibrates the sensors 18 and/or compensates the data that these sensors output. Additionally, utilizing sensor data output by the sensors 18 and/or one or more of the remote sensors, the controller 12 also calibrates and/or compensates selected remote sensors. Controller 12 may perform the calibration and/or compensation functions according to logic and instructions stored in memory 14.

Memory 14 comprises a computer readable medium representing the entire hierarchy of memory in the cellular device 10. Memory 14 may comprise both random access memory (RAM) and read-only memory (ROM), and may be implemented, for example, as one or more discrete devices, stacked devices, or removable devices, such as a flash drive or memory stick, or may be integrated with controller 12. In one embodiment, memory 14 stores the computer program instructions and data required for operating the cellular device 10 in non-volatile memory, such as EPROM, EEPROM, and/or flash memory. The program instructions and data may include sensor data 24 output by sensors 18 and/or one or more remote sensors integrated into remote devices and items. Additionally, memory 14 may also store one or more different profiles 26 that are used by the controller 12 in conjunction with the sensor output data. For example, as described in more detail later, the profiles 26 may include user activity profiles that contain information and data specific to a current activity of the user and/or data specific to one or more of the sensors.

The user Input/Output interface (UI) 16 generally includes one or more components that permit the user to interact with, and control the operation of, the cellular device 10 and the sensors 18. As is known in the art, the UI 16 generally comprises a keypad, a display, which may be touch-sensitive, a speaker, and a microphone. The sensors 18, as stated above, may be any sensors known in the art. Upon detecting their respective physical properties or quantities, the sensors 18 output the resultant sensor data to controller 12. In turn, controller 12 will use this data to initialize and/or calibrate one or more of the sensors 18 (or one or more of the remote sensors) and/or compensate sensors that may not be optimally calibrated.

As stated above, the communications interface of cellular device 10 comprises a short and long range transceiver 20, 22, respectively. As is known in the art, short-range transceiver could be configured to establish a bi-directional communications link with one or more peripheral devices, or accessory devices, or some other user device or item via a short-range interface. Once established, the cellular device 10 can transmit sensor data to, and receive sensor data from, one or more remote devices. In one embodiment, the short-range transceiver 20 comprises a BLUETOOTH transceiver or Wi-Fi transceiver operating according to the IEEE 802.xx family of standards.

The long-range transceiver 22 may comprise any fully functional, suitable interface for communicating data to, and receiving data from, one or more sensors contained in one or mote remote devices. In one embodiment, which is disclosed in more detail later, the long-range transceiver 22 comprises an Ethernet interface to allow the cellular device 10 to communicate sensor data with a network server. In other embodiments, the long-range transceiver 22 comprises a fully functional cellular transceiver capable of communicating with remote devices and servers via a base station in a wireless communications network. In such cases, the long-range transceiver 22 may function according to any known standard, including Global System for Mobile Communications (GSM), TIA/EIA-136, cdmaOne, cdma2000, UMTS, and Wideband CDMA.

The headset 30a, which represents accessory devices, peripheral devices, and other items that are "wearable" by a user, comprises a controller 32, a memory 34, a short-range transceiver 36, and one or more sensors 38. Each of these components operates similarly to those components described above with respect to the cellular device 10. Therefore, their operation is not further detailed here. It is sufficient to say that the sensors 38 in the headset 30 detect or sense specific properties or quantities, and provide sensor data 40 representing those measured properties and/or quantities to the controller 32 for storage in memory 14. Additionally, that same sensor data 40 may also be transmitted to the cellular device 10 via the short-range transceiver 36 and an established short-range communications link.

Figure 3:
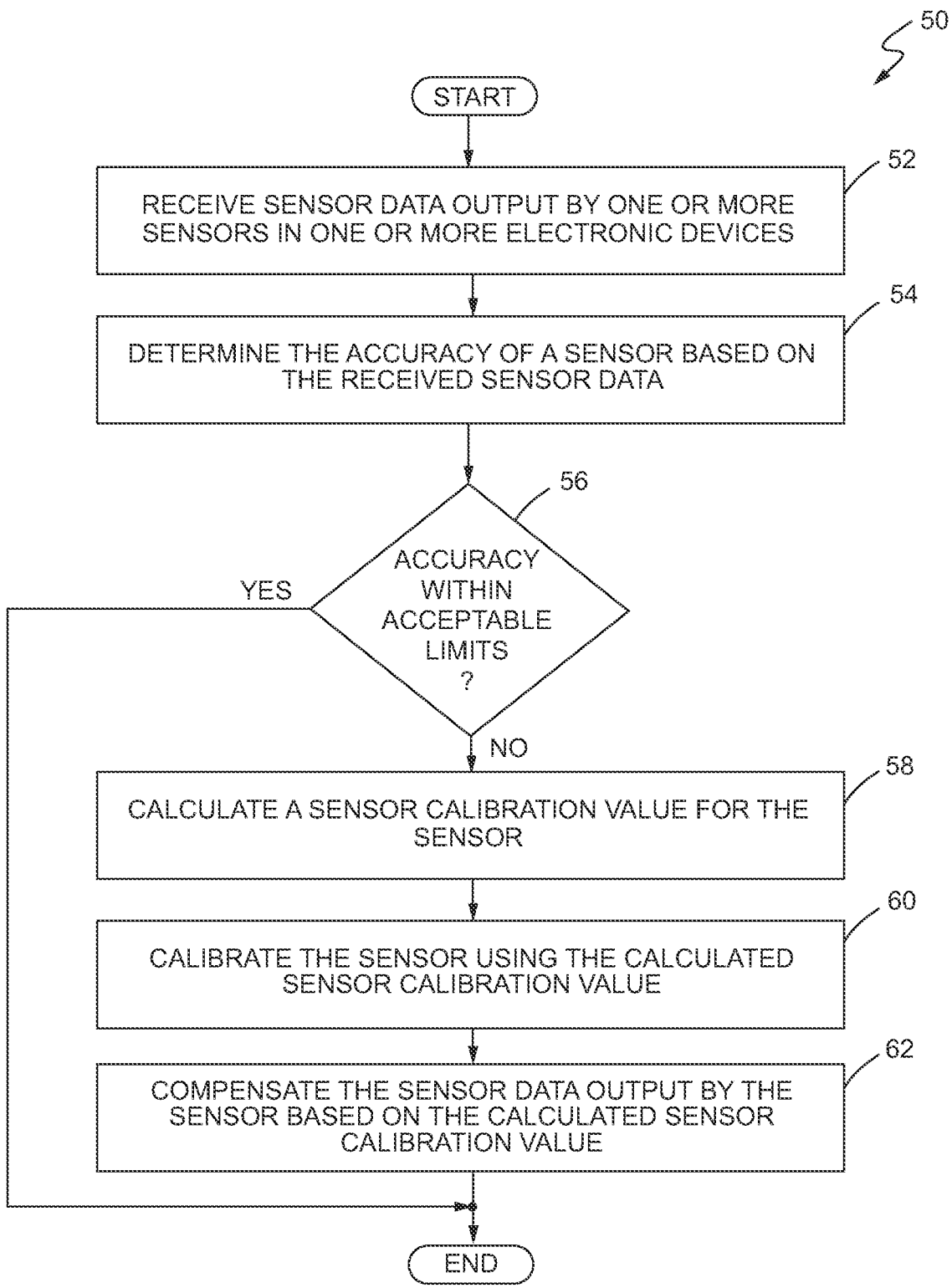
FIG. 3 is a flow diagram illustrating a method of performing one embodiment of the present invention.

FIG. 3 is a flow diagram illustrating an exemplary method 50 of calibrating and compensating a sensor using sensor data provided by one or more other sensors disposed in loosely-coupled, but different devices according to one embodiment of the present invention. As described herein, the method 50 is performed by the controller 12 at the cellular device 10. However, this is for illustrative purposes only. Any of the controllers 32 in any of the peripheral devices or items 30 may perform method 50 alone or in conjunction with one or more other devices. As seen later in more detail, method 50 may be performed by a network server accessible to the devices and items 10, 30 via a public or private packet data network, such as the Internet, for example.

Method 50 begins with the cellular device 10 receiving the sensor data from one or more sensors disposed in one or more other devices or items 30 (box 52). As previously stated, such sensors may comprise accelerometers, magnetometers, gyroscopes, thermometers, pressure sensors, and applications that output position data, and be disposed in any number of different devices. Upon receiving the sensor data from these sensors, the controller 12 may use the data to determine the accuracy of the sensors (box 54).

For example, consider a situation where the sensor 18 in cellular device 10 comprises a Global Positioning Satellite (GPS) receiver, and the sensor 38 in headset 30a comprises an electronic compass. As is known in the art, the GPS receiver detects signals transmitted from a plurality of satellites in Earth's orbit, and processes those signals to provide a current location of the cellular device 10. The compass in headset 30a also outputs sensor data that indicates an absolute direction of movement for the cellular device 10.

It is known that metallic materials and magnetic fields in close proximity to the device 10 will tend to negatively affect the accuracy of the compass output. Therefore, when faced with such interference, a user must recalibrate the compass. Given that the compass is in headset 30a, conventional recalibration techniques, such as the movement of the device in a "figure 8" motion, are not feasible. Therefore, based on an analysis of the sensor data output by the compass in the headset 30a, the controller 12 in the cellular device 10 may utilize the positional output of the GPS application to recalibrate the compass.

Particularly, in the embodiment of FIG. 3, the controller 12 may test the sensor data output by the sensor 38 (e.g., the compass) using any method known the art. If the controller 12 determines that the sensor data is accurate within acceptable limits (box 56), the method 50 ends. If controller 12 determines that the sensor data output by sensor 38 is not accurate, the controller 12 calculates a sensor calibration value for the sensor 38 (box 58). Once calculated, the controller 12 calibrates the sensor 38 using the calculated sensor value (box 60). Additionally, the controller 12 may also compensate the received sensor data output by the sensor 38 that was just calibrated.

Figure 4A:
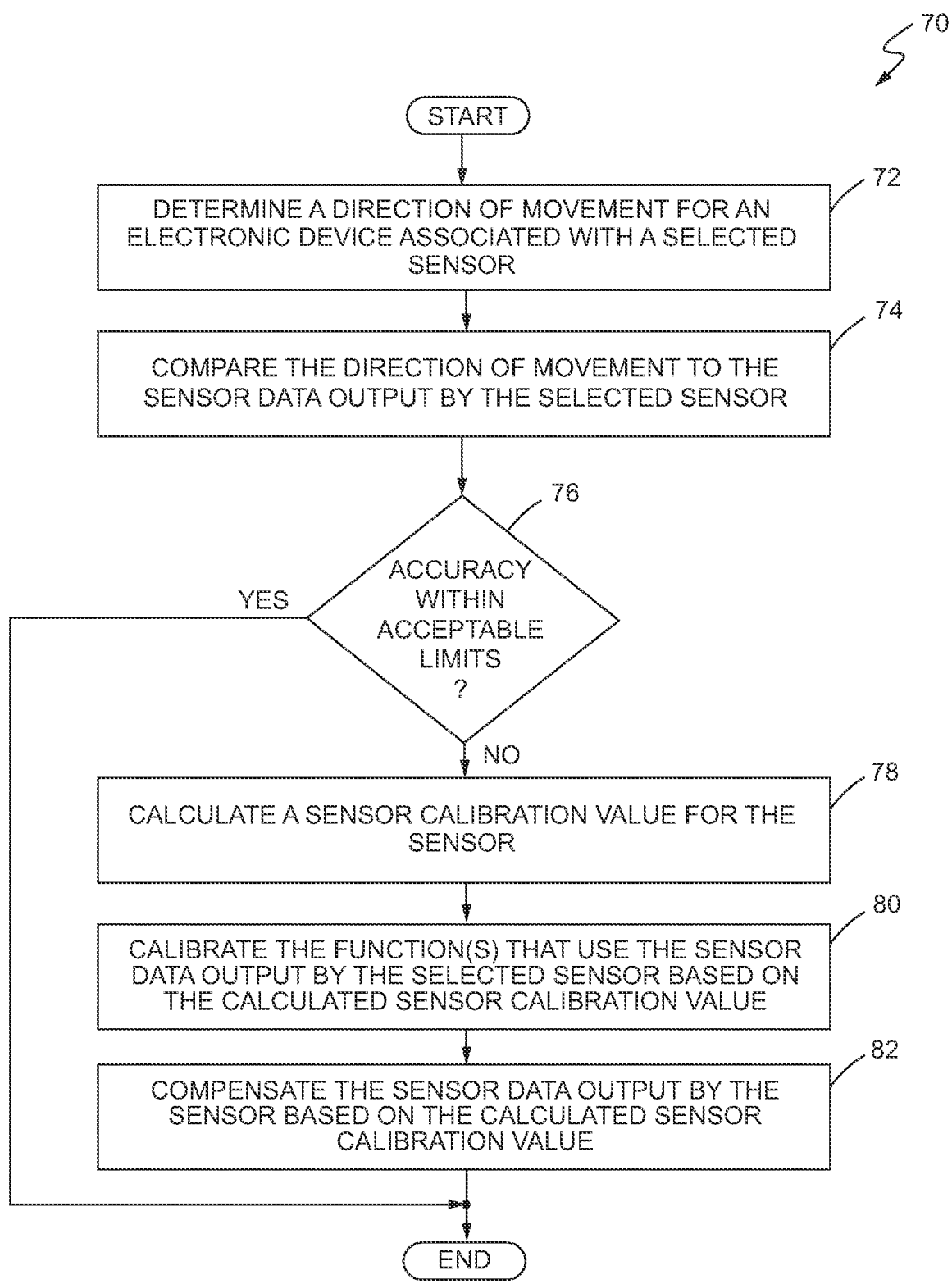
FIGS. 4A-4C are flow diagrams illustrating methods for determining the accuracy of one or more sensors according to various embodiments of the present invention.
Figure 4B:
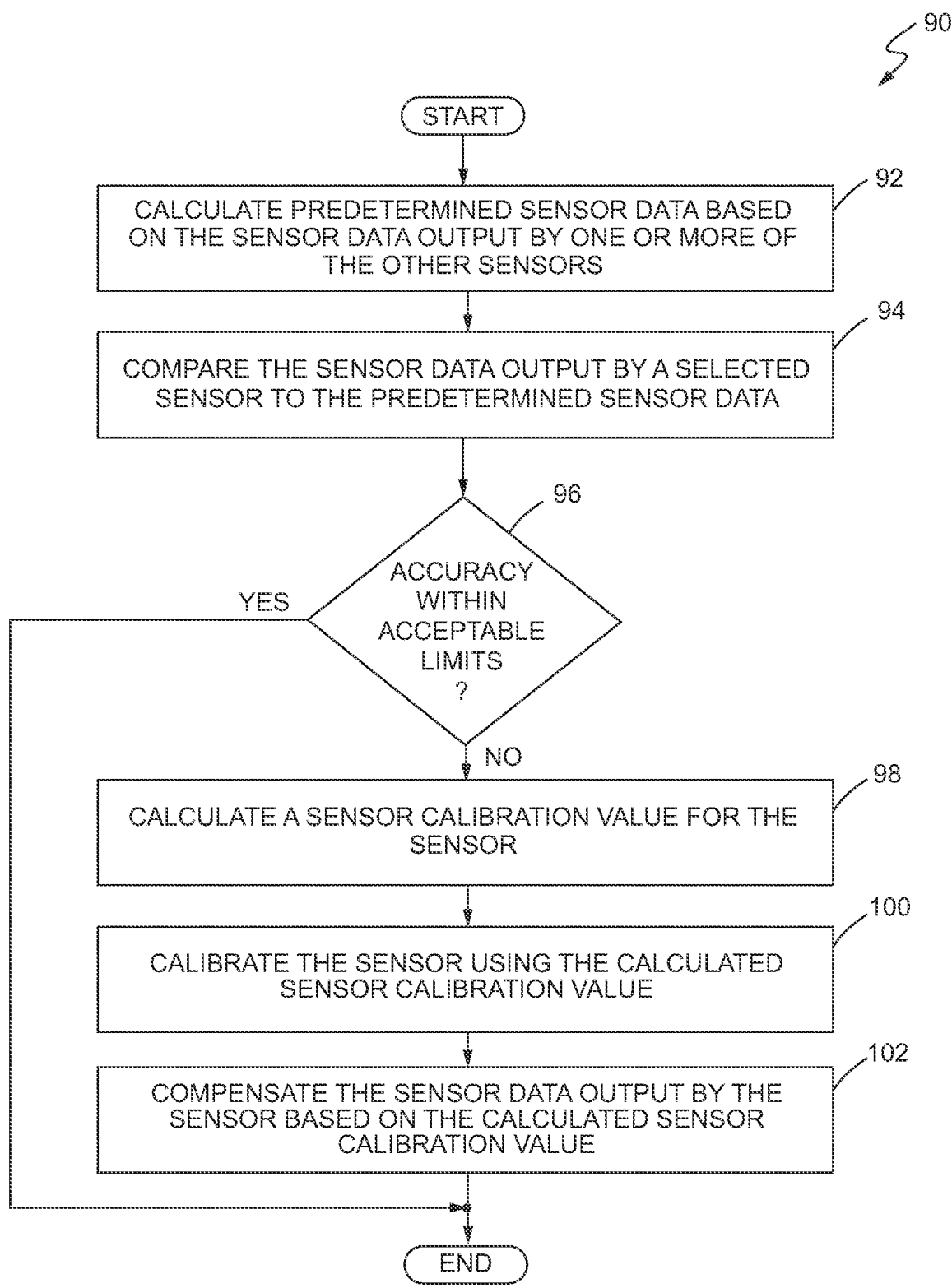
Figure 4C:
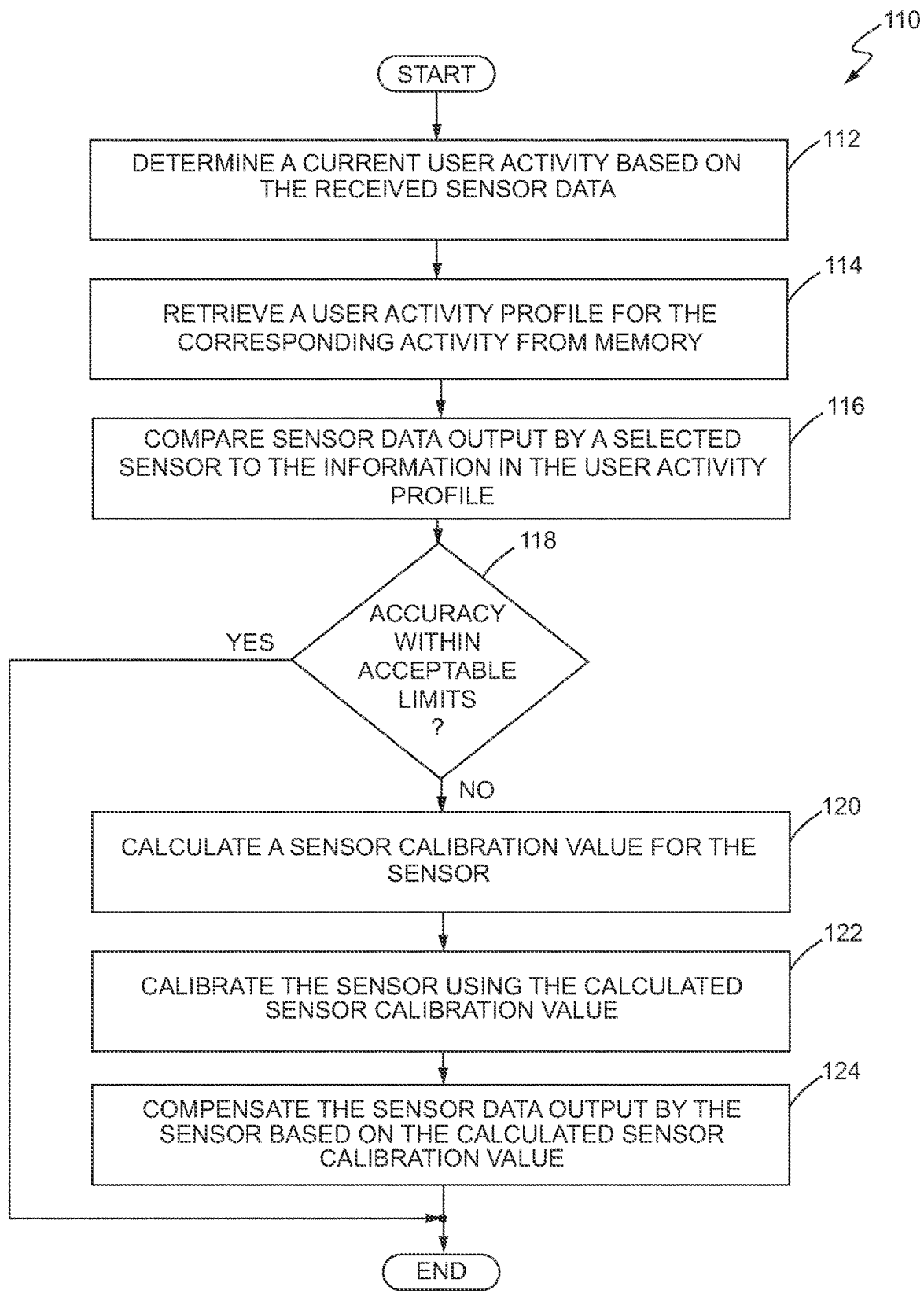

There are a variety of ways for the controller 12 to determine whether the given sensor data 40 is accurate to within acceptable limits, as well as to recalibrate the sensor 38 if the sensor data output by that sensor is not within acceptable limits. FIGS. 4A-4C illustrate some of those methods.

FIG. 4A, for example, illustrates a method 70 in which controller 12 compares the sensor data output by sensor 38 to the sensor data received from one or more other sensors to determine whether the sensor 38 needs recalibration. Particularly, using the situation where the sensor 38 in headset 30a comprises a compass as an example only, controller 12 may be configured to monitor the positional data output by the GPS receiver. After a few meters, the controller 12 would be able to determine that the user is moving due north. Further, consider that the sensor data received from a compass needing recalibration in headset 30a indicates that the user is moving in a northwesterly direction. Typically, one would assume that the user is facing in the same direction as he/she travels. Therefore, performing a simple comparison between these two directions at the controller 12 (box 74) would yield the discrepancy. A further check (box 76) would reveal that the discrepancy was not within acceptable limits (e.g., within 1 degree). Therefore, in response to the failed check, the controller 12 would calculate a sensor calibration value to recalibrate the compass (box 78).

The calculations may comprise any calculations or computations known in the art, and may or may not be specific to a particular sensor. For example, many sensors may execute proprietary functions or algorithms designed to reset, initialize, or recalibrate a sensor. In such cases, the controller 12 may simply send a control signal as the sensor calibration value to the sensor needing recalibration. In another example, the controller 12 may simply send a value that is used to replace a parameter used by the sensor. In this embodiment, however, the controller 12 is configured to use the value to calibrate the function(s) or algorithm(s) that are used to calculate a direction of movement (box 80). In such cases, the actual sensor components that output the data (e.g., the MEMS devices) may not be calibrated directly. Instead, the function(s) that interpret and use the sensor data to calculate the direction of movement are calibrated. Additionally or alternatively, the controller 12 may, if desired, compensate the sensor data to ensure that the output is accurate and able to be used for other applications (box 82). For example, the controller 12 may compensate the inaccurate sensor data by adding or subtracting a calculated offset value to/from the inaccurate sensor data. Alternatively, the controller 12 may simply replace the inaccurate sensor data (i.e., the absolute direction) output by the compass with the correct sensor data used in the comparison.

FIG. 4B illustrates another method 90 in which the controller 12 determines the accuracy of a sensor 38 using predetermined sensor data (i.e., expected sensor data). Method 90 begins with the controller 12 calculating a predetermined sensor data value based on the sensor data received from one or more sensors integrated in one or more other devices and/or items (box 92). The predetermined sensor data may comprise, for example, an absolute direction for a compass, a reference value for a known altitude relative to sea level, a rotational measurement for a gyroscope, or the coordinates of a known geographical location. Other predetermined sensor data not specifically detailed here is also possible. The controller 12 may compare this predetermined data against the sensor data that is received from a selected sensor (box 96). If the sensor data is deemed accurate to within a predetermined limit, the method 90 ends. Otherwise, the controller 12 calculates a sensor calibration value for the sensor (box 98), calibrates the sensor using the calculated value (box 100), and then compensates any inaccurate sensor data received from the sensor using the calculated sensor value (box 102), as previously described.

FIG. 4C illustrates another method 110 performed at the cellular device 10 of analyzing the sensor data and calibrating the sensor 38 based on the analysis. Method 110 begins with the controller 12 determining a current activity for the user based on the sensor data received from the sensors (box 112). For example, the user may have a pedometer that indicates when the user takes a step. The user may have other devices that include biosensors for measuring the user's heartbeat or body temperature, or an accelerometer to determine whether the user is moving fast or slow. Based on this sensor data, the controller 12 could determine whether a user is exercising, walking, or traveling in a vehicle such as a car, train, or bus, for example. The ability to determine a user activity is beneficial because the present invention could determine whether the user is on a roadway, railway, or bike path, for example, and use this knowledge for sensor calibration and/or compensation functions.

As previously stated, the sensors may need recalibration from time-to-time to ensure accurate readings. However, different sensors may need to be calibrated in different ways depending upon the user activity. Further, each may have a different sensitivity. Therefore, the controller 12 may, based on the sensor data analysis, retrieve a user activity profile from memory 14 (box 114). The profiles may contain data such as which sensors to calibrate, predetermined values to use in determining the accuracy of the given sensors, and values to use in calibrating selected sensors for the particular determined activity. Once retrieved, the controller 12 may compare the sensor data output by a selected sensor to the data and information retrieved with the user activity profile (box 116). If the sensor data output by the selected sensor is within acceptable limits (box 118), the method 110 ends. Otherwise, the controller 12 calculates a sensor calibration value for the sensor (box 120), calibrates the sensor using the calculated value (box 122), and, if desired, compensates the inaccurate sensor data received from the selected sensor (box 124), as previously described.

Figure 5:
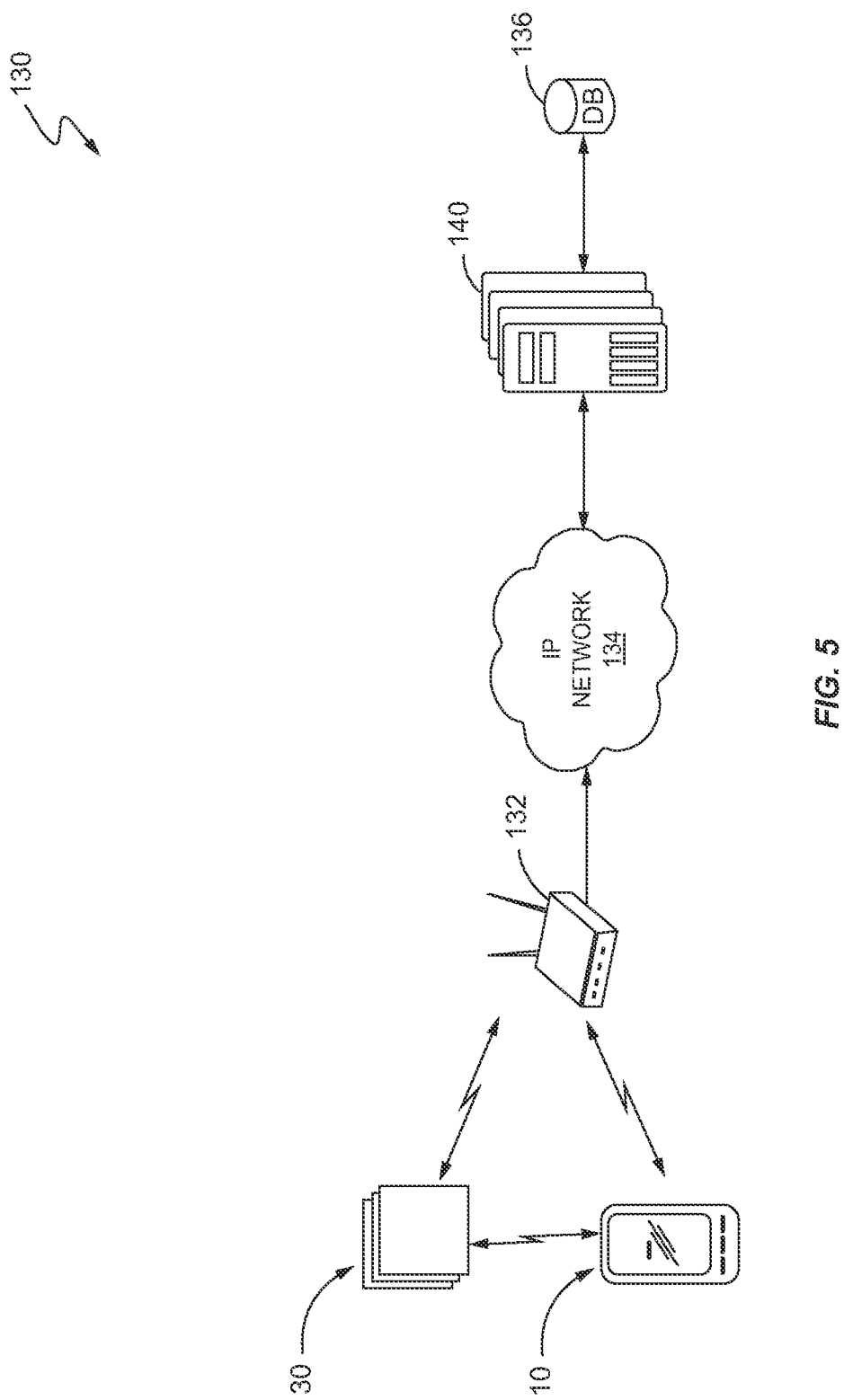
FIG. 5 is a block diagram illustrating a communications network configured to calibrate and/or compensate one or more sensors in one or more electronic devices according to one embodiment of the present invention.

Although the previous embodiments describe the present invention in the context of cellular device 10 performing the data analysis and calibration, the present invention is not so limited. FIG. 5 illustrates another embodiment wherein the analysis and calculation for the calibration and compensation is performed at a network server.

As seen in FIG. 5, system 130 comprises a WiFi router 132 connected to a publically accessible packet data network 134, such as the Internet, for example. The router 132 and the network 134 communicatively connect the cellular device 10 and one or more other devices 30, each having sensors as previously described, to a network server 140 and a database (DB) 136. Although not specifically shown, the connection to the network 134 may be made via a base station in a wireless cellular network, as is known in the art. In one or more embodiments of the present invention, the sensors in one or more of the devices or items 10, 30 transmit their respective sensor data to the server 140 for storage in the DB 136. The transmission may be accomplished individually (i.e., each device and item 10, 30 communicates by itself to server 140), or collectively (e.g., where one or more of the devices or items 10, 30 collect the sensor data and then communicate the collected data to the server 140).

Figure 6:
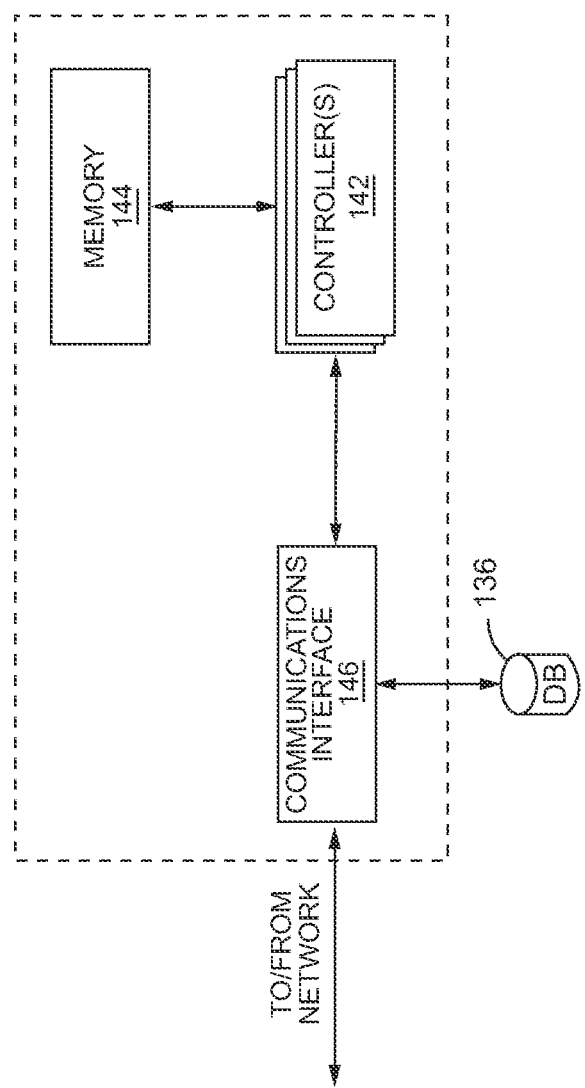
FIG. 6 is a block diagram illustrating some exemplary components of a network server configured to calibrate one or more sensors at one or more electronic devices according to one embodiment of the present invention.

FIG. 6 is a block diagram that illustrates some of the components of such a server 140 configured according to one embodiment of the present invention. As seen in FIG. 6, the server 140 may comprise one or more controllers 142, a memory 144, and a communication interface 146. The communication interface 146 communicates with the devices and items 10, 30 using known protocols and procedures to receive sensor data from the sensors, and to return sensor calibration and/or compensation values to those sensors. Additionally, the communications interface 136 may also provide a port to communicate data and information stored on DB 136.

Figure 7:
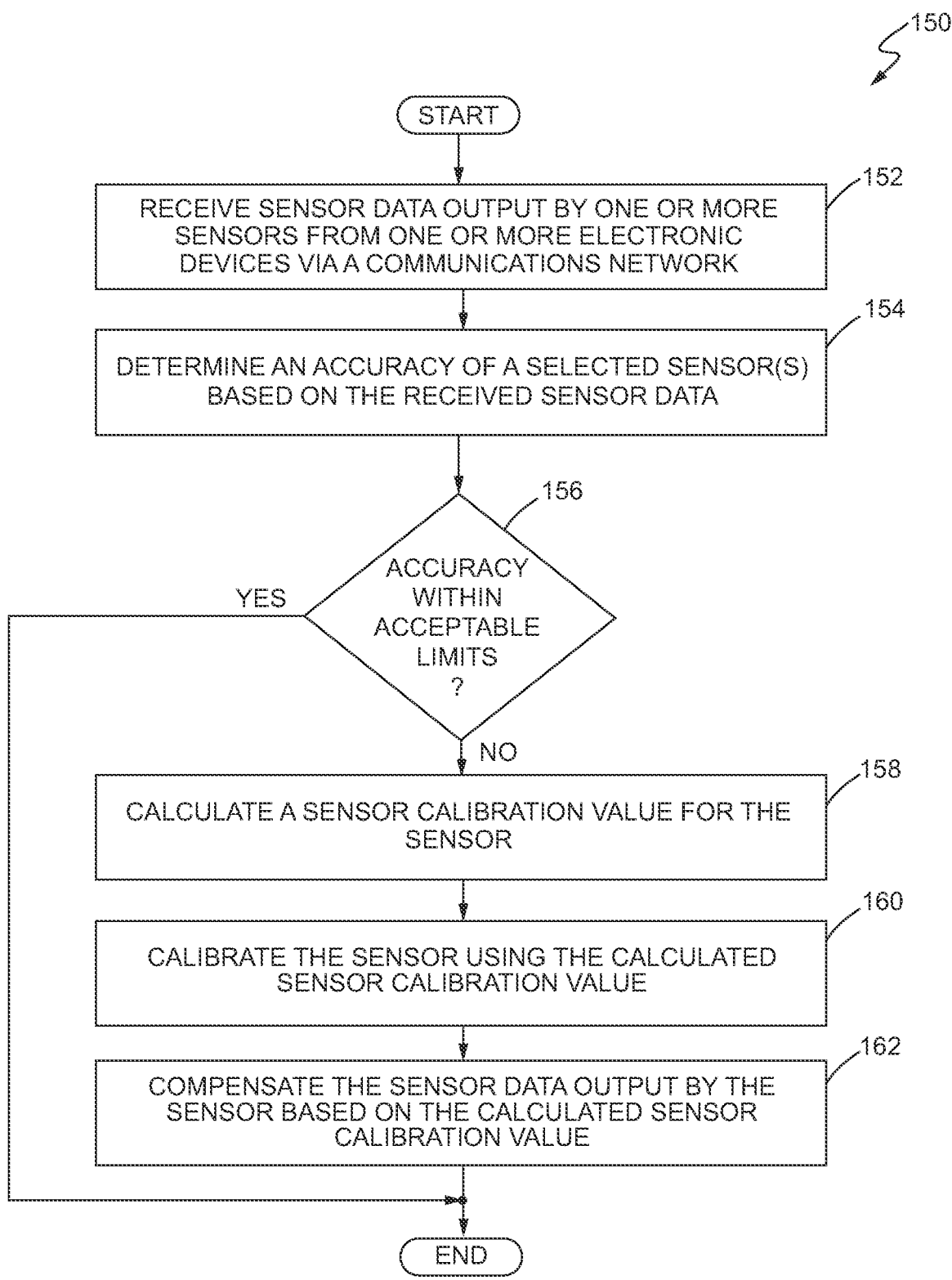
FIG. 7 is a flow diagram illustrating a method performed by a network server of calibrating and/or compensating one or more sensors in one or more electronic devices according to one embodiment of the present invention.

FIG. 7 is a flow diagram that illustrates a method 150 performed at the network server 140 of calibrating the sensors at devices 10, 30. Method 150 begins with the network server 140 receiving sensor data output from one or more sensors via IP network 134 (box 152). Upon receipt, controller(s) 142 in the server 140 may determine the accuracy of a selected one of the sensors based on the received sensor data (box 154). Any of the methods previously described may be used to determine accuracy. If the controller(s) 142 determine that the sensor data output by the selected sensor is within acceptable limits (box 156), the method 150 ends. Otherwise, the controller(s) 142 calculate a sensor calibration value for the selected sensor (box 158), send the calculated value back to the devices 10, 30 to calibrate the sensor (box 160), and, if desired, compensates the inaccurate sensor data received from the selected sensor (box 162), as previously described. The compensated values may then be stored in DB 136 for use in future analysis and calibration.

The present invention may, of course, be carried out in other ways than those specifically set forth herein without departing from essential characteristics of the invention. For example, the previous embodiments describe the present invention in the context of one or more sensors associated with a single user. However, the invention is not so limited. Consider, for example, a plurality of individual users riding on a bus. One or more of the users may have a cellular device 10 or accessory/peripheral device 30 that has a compass. Each of these devices could be configured to periodically determine an absolute direction for their respective user and provide that sensor data to the server 140. Upon receipt, the server 140 could analyze the sensor data output by each of the sensors in each of the devices 10, 30, and determine which, if any, require recalibration. For example, the server 140 may compare the sensor data received from each device to see whether they all indicate the same direction of travel within a predetermined number of degrees. Based on the analysis, the server 140 may then calculate a sensor calibration value as an average of all such values received, and send that value to one or more of the devices 10, 30 for use in calibrating the sensor, the function(s) or algorithm(s) that interpret and use the sensor data in the calculations, and/or compensating the sensor data, as previously described. In another embodiment, the calculated value may be sent to a completely different set of one or more devices to calibrate and/or compensate one or more sensors in those different devices. Accordingly, the present invention can utilize the sensor data output by a first device to calibrate and/or compensate a sensor in a completely different device.

Additionally, the figures illustrate an embodiment in which it is assumed that the user is facing the same direction of travel. However, this may not always be the case. For example, a user may, from time to time, look in other directions while biking or walking to check for traffic or other items, objects, and people that the user finds interesting. Therefore, in one embodiment, the controller 12 is configured to calculate a value, such as a mean value, for example, that generally indicates the mean direction of the user's head. The controller 12 may then assume that the mean direction of the user's head is the same as the user's direction of travel, and calibrate the function(s) that calculate the direction of travel, or compensate the data output by the sensors, as previously described.

Further, those skilled in the art will understand that the controller 12 need not be a single processor disposed in a user device, such as cellular telephone 10, but may be one or more processors disposed in cellular telephone 10 and/or in one or more other integrated circuits associated with one or more sensors. Therefore, the present embodiments are to be considered in all respects as illustrative and not restrictive, and all changes coming within the meaning and equivalency range of the appended claims are intended to be embraced therein.

What is claimed is:

1. A method for calibrating a selected sensor by a communications device, the method comprising:
   receiving sensor data at the communication device from a plurality of remote sensors distributed across a plurality of remote electronic devices different from the communications device, wherein the received sensor data includes data from at least one sensor that is different than the selected sensor and outputs data indicative of different physical property than the selected sensor;
   determining a sensor calibration value based on the received sensor data, wherein determining the sensor calibration value comprises evaluating sensor data for the selected sensor based at least on the data from the at one least sensor that is different than the selected sensor; and
   calibrating the selected sensor using the sensor calibration value, wherein calibrating the selected sensor comprises:
      generating an initialization command for the selected sensor based on the sensor calibration value; and
      sending the initialization command to the selected sensor to execute a function that resets, initializes, or recalibrates the selected sensor in accordance with the sensor calibration value.

2. The method of claim 1, further comprising:
   determining an accuracy of the selected sensor by analyzing sensor data received from the selected sensor based on the sensor data received from the plurality of remote sensors; and
   calculating the sensor calibration value based at least in part on the determined accuracy of the selected sensor.

3. The method of claim 1 wherein calibrating the selected sensor further comprises updating a sensor calibration parameter associated with the selected sensor based on the determined sensor calibration value.

4. The method of claim 1, wherein the selected sensor comprises one of the plurality of remote sensors distributed across the plurality of remote electronic devices different from the communications device.

5. The method of claim 2, wherein analyzing the sensor data comprises comparing the sensor data received from the selected sensor to predetermined sensor data, and further comprising calculating the predetermined sensor data based on the sensor data output by the plurality of remote sensors distributed across the plurality of remote electronic devices different from the communications device.

6. The method of claim 2 wherein analyzing the sensor data comprises:
   determining movement for a device that includes the selected sensor; and
   comparing the sensor data received from the selected sensor to the determined movement.

7. The method of claim 2 wherein analyzing the sensor data comprises:
   retrieving, from a memory, a user activity profile for a user of the device associated with the selected sensor based on the sensor data output by the selected sensor; and
   comparing the sensor data output by the selected sensor to information associated with the user activity profile to determine the accuracy of the selected sensor.

8. The method of claim 2 wherein receiving the sensor data output by the plurality of remote sensors comprises receiving the sensor data at a network server, and wherein determining the sensor calibration value comprises calculating the sensor calibration value based on the received sensor data.

9. The method of claim 2 further comprising compensating the sensor data received from the selected sensor using the sensor calibration value.

10. The method of claim 2 wherein calibrating the selected sensor further comprises calibrating, based on the determined sensor calibration value, one or more functions that interpret the sensor data output by the selected sensor.

11. A communications device for calibrating a selected sensor of the communications device, the communications device comprising:
   a communications interface configured to receive sensor data output by a plurality of remote sensors distributed across a plurality of remote electronic devices different from the communications device, wherein the received sensor data includes data from at least one senor that is different than the selected sensor and outputs data indicative of a different physical property than the selected sensor; and
   a processing circuit configured to:
      determine a sensor calibration value for the selected sensor based on the received sensor data, wherein to determine the sensor calibration value the processing circuit is configured to evaluate sensor data for the selected sensor based at least on the data from the at least one sensor that is different than the selected sensor, and calibrate the selected sensor based on the sensor calibration value, wherein, to calibrate the selected sensor, the processing circuit is configured to:

generate an initialization command for the selected sensor based on the sensor calibration value; and send the initialization command to the selected sensor to execute a function that resets, initializes, or recalibrates the selected sensor in accordance with the sensor calibration value.

12. The device of claim 11, wherein the processing circuit is further configured to:

determine an accuracy of the selected sensor by analyzing the sensor data output by the selected sensor based on the sensor data received from the plurality of remote sensors; and calculate the sensor calibration value based at least in part on the determined accuracy of the selected sensor.

13. The device of claim 12, wherein the processing circuit is further configured to:

calculate predetermined sensor data based on the received sensor data output by the plurality of remote sensors; and compare the sensor data output by the selected sensor to the predetermined sensor data to determine the accuracy of the selected sensor.

14. The device of claim 12 wherein the processing circuit is further configured to:

determine movement for the remote device having the selected sensor; and compare the sensor data output by the selected sensor to the determined movement.

15. The device of claim 12 further comprising a memory configured to store user activity profiles, and wherein the processing circuit is further configured to:

retrieve a user activity profile from the memory based on the sensor data output by the selected sensor; and compare the sensor data output by the selected sensor to information in the user activity profile to determine the accuracy of the selected sensor.

16. The device of claim 11 wherein the processing circuit is further configured to calibrate the selected sensor by updating a sensor calibration parameter associated with the selected sensor.

17. The device of claim 11 wherein the processing circuit is further configured to compensate the sensor data output by the selected sensor based on the received sensor data.

18. The device of claim 11 wherein the selected sensor comprises a sensor integrated in the communications device, and wherein the processing circuit is further configured to calibrate the integrated sensor based on the received sensor data.

19. The device of claim 11 wherein the processing circuit is further configured to calibrate the selected sensor by calibrating, based on the determined sensor calibration value, one or more functions that interpret data output by the selected sensor.

* * * * *